United States Patent [19]

Van der Lely et al.

[11] 4,382,473
[45] May 10, 1983

[54] SOIL CULTIVATING MACHINE

[75] Inventors: Ary Van der Lely, Maasland; Arie Kuipers, Brielle, both of Netherlands

[73] Assignee: C. Van der Lely N.V., Maasland, Netherlands

[21] Appl. No.: 215,453

[22] Filed: Dec. 11, 1980

[30] Foreign Application Priority Data

Dec. 17, 1979 [NL] Netherlands .................. 7909060

[51] Int. Cl.³ ............................................ A01B 15/08
[52] U.S. Cl. .................................. 172/33; 172/125; 172/225; 172/447
[58] Field of Search ............... 172/33, 125, 718, 427, 172/285, 447, 439, 696, 167, 225, 314

[56] References Cited

U.S. PATENT DOCUMENTS

| 18,609 | 11/1857 | Stanley | 172/718 |
|---|---|---|---|
| 1,867,517 | 7/1932 | Lofstrand | 172/33 |
| 1,884,009 | 10/1932 | Lofstrand | 172/33 |
| 2,063,584 | 12/1936 | Collins | 172/33 |
| 2,426,548 | 8/1947 | Capon et al. | 172/427 X |
| 2,517,721 | 8/1950 | Schleper | 172/718 X |
| 2,689,512 | 9/1954 | Skromme | 172/33 |
| 3,583,494 | 6/1971 | Thompson | 172/285 |
| 3,920,080 | 11/1975 | Vassiliou | 172/447 |
| 3,971,445 | 7/1976 | Lely | 172/125 X |

FOREIGN PATENT DOCUMENTS

| 734124 | 7/1932 | France | 172/718 |
|---|---|---|---|
| 71274 | 5/1961 | India | 172/439 |
| 292951 | 7/1965 | Netherlands | 172/718 |
| 883830 | 12/1961 | United Kingdom | 172/439 |

Primary Examiner—Paul E. Shapiro
Attorney, Agent, or Firm—Penrose Lucas Albright

[57] ABSTRACT

A soil cultivating machine such as a plow comprises a share followed by a soil guide which is in the form of a moldboard made up of power driven rotary guide elements. The elements are elongated and are all driven from a common shaft which can include a change-speed device to enable the rotary speed of the elements to be changed. The form of the guide can be altered by adjusting the relative angularities of the elements and the elements can be rotated at different speeds. The elements preferably extend less horizontally from front to rear where they are substantially vertical. An overhead frame beam interconnects the rear of the guide to a pivot on a trestle coupling. Also, the rear of the machine can be supported by a furrow wheel and a ground wheel on one side of the trestle supports the front of the machine.

15 Claims, 11 Drawing Figures

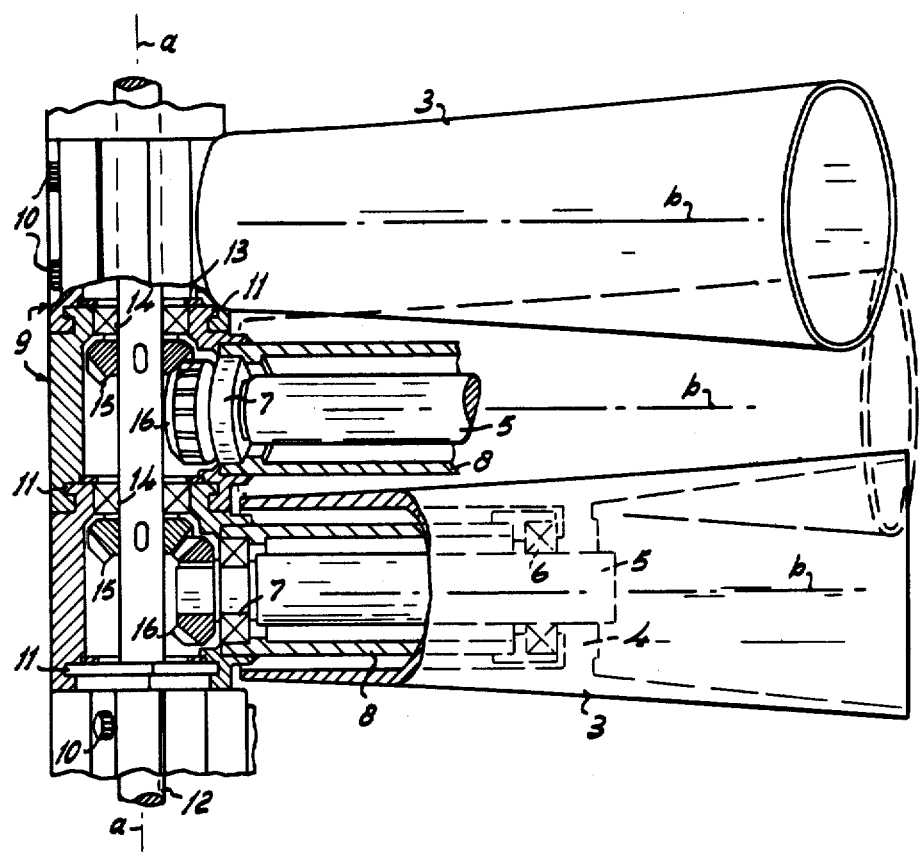
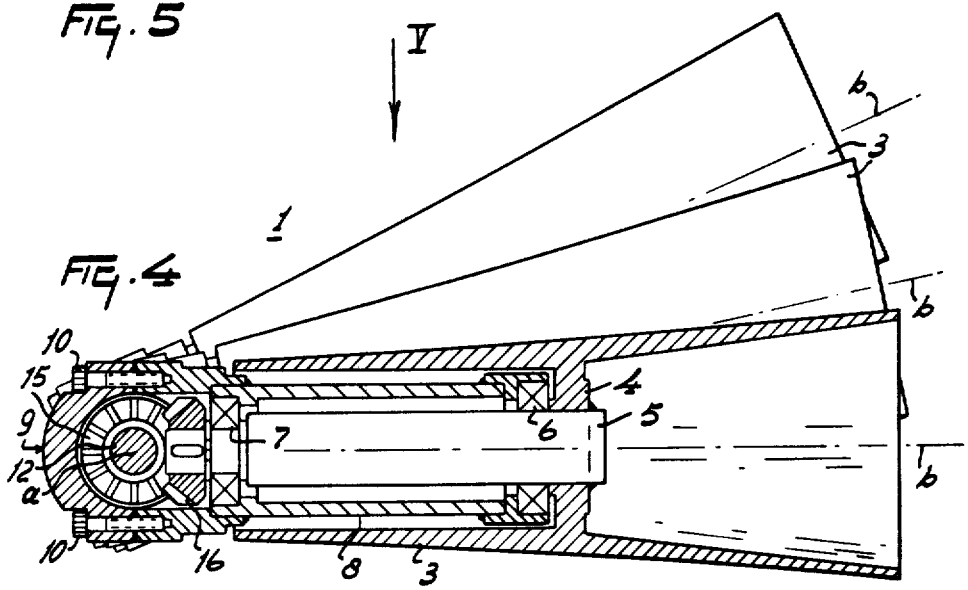
FIG. 5
FIG. 4

4,382,473

SOIL CULTIVATING MACHINE

SUMMARY OF THE INVENTION

This invention relates to a soil cultivating machine, particularly, although not exclusively, a plow.

According to one aspect of the present invention there is provided a soil cultivating machine comprising a frame for attachment to a tractor, and a guide for earth, the guide comprising guide elements disposed one behind the other in the direction of movement of earth along the guide in operation, the guide elements being power-driven during operation from a common drive which includes a change-speed device.

The provision of a change-speed device allows adjustment of the rotary speed of all of the guide elements to provide an optimum displacement of the earth passing over them. The travel of the earth along the guide is affected by the nature of a layer of moisture which forms between the earth and the guide. The formation of this layer is dependent on the nature of the soil, the moisture content of the soil and the pressure of the earth on the guide elements. The moisture content of the soil frequently varies with the prevailing conditions, while the pressure of the earth on the guide elements depends not only on the kind of soil to be worked but also on the travelling speed of the machine.

With the aid of the construction proposed a minimum power requirement can be obtained under widely differing conditions.

According to another aspect of the present invention there is provided a soil cultivating machine comprising a frame for attachment to a tractor, and two guides for earth, each guide comprising guide elements disposed on behind the other in the direction of movement of earth along the guide in operation, the guides being pivotable together about an axis extending in the intended direction of operative travel of the machine.

For a better understanding of the present invention and to show how it may be carried into effect, reference will now be made, by way of example, to the accompanying drawings, in which:

BRIEF DESCRIPTION OF THE DRAWINGS

FIG. 4 is a sectional view taken on the line IV—IV in FIG. 2;

FIG. 5 is a partly sectioned view taken in the direction of the arrow V in FIG. 4;

DESCRIPTION OF THE PREFERRED EMBODIMENTS

Figure 1:
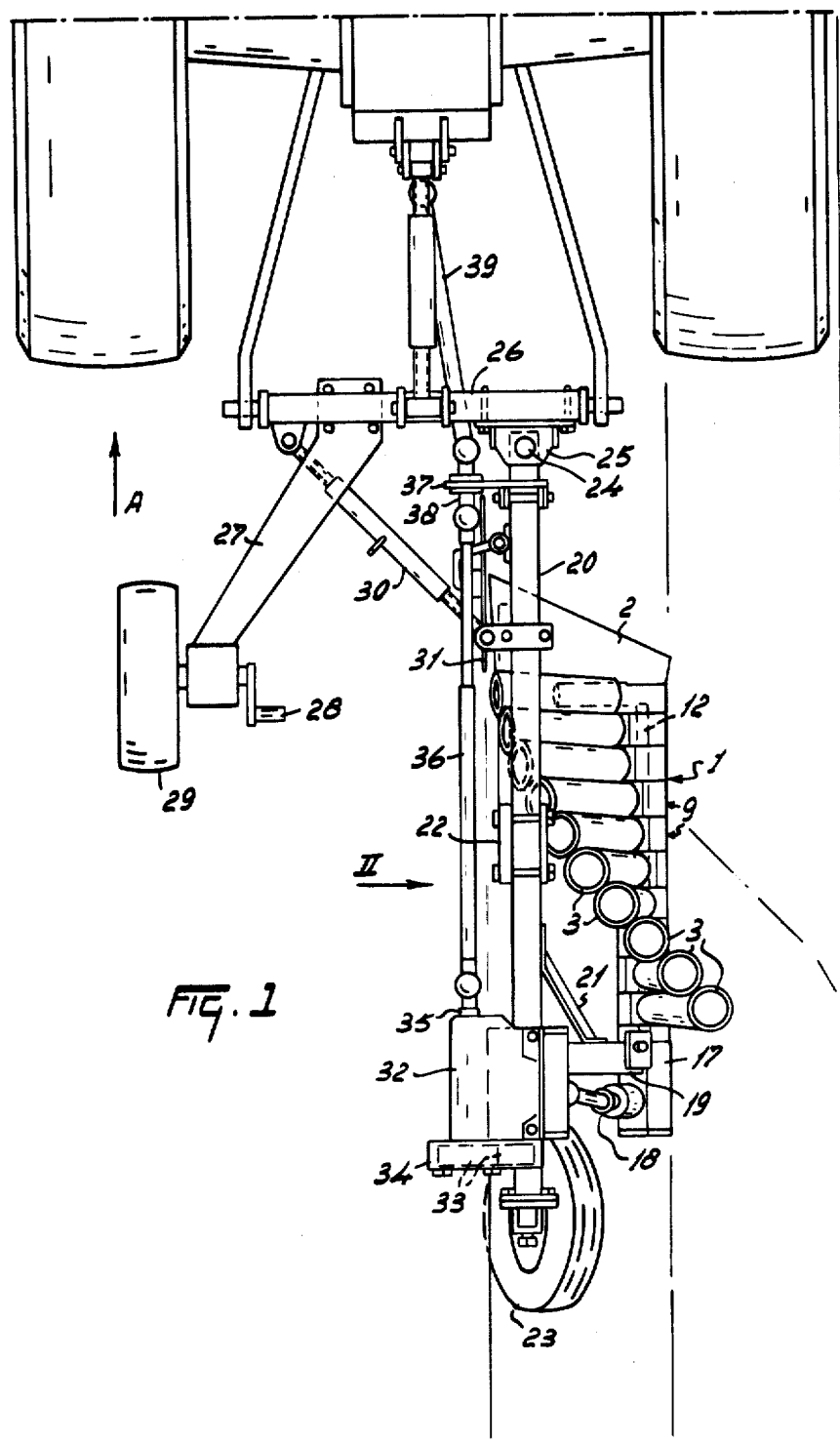
FIG. 1 is a plan view of a plow hitched to a tractor.
Figure 2:
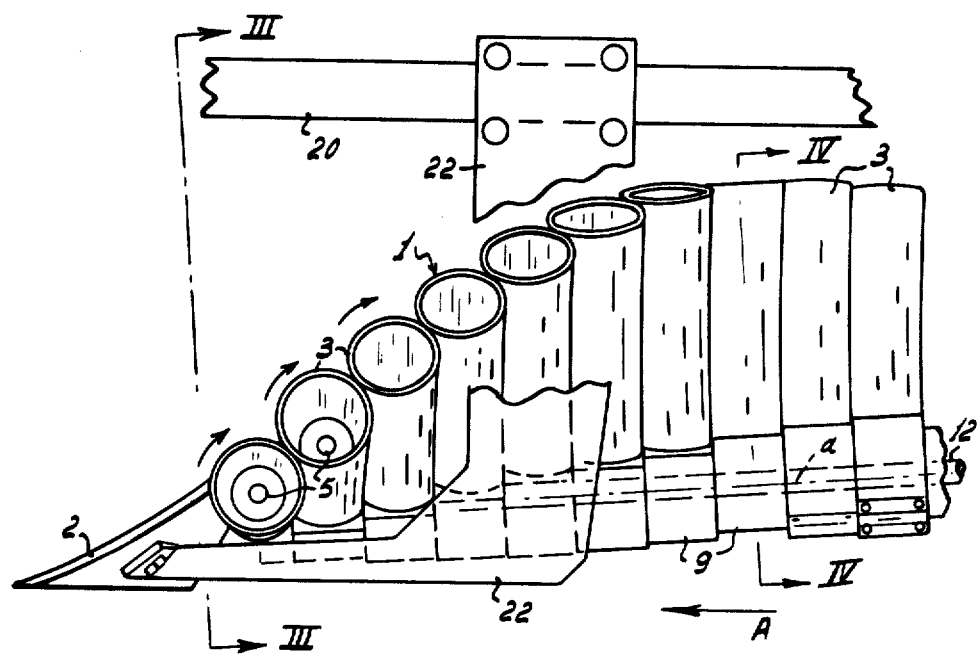
FIG. 2 is an enlarged partial side view, taken in the direction of the arrow II in FIG. 1.
Figure 3:
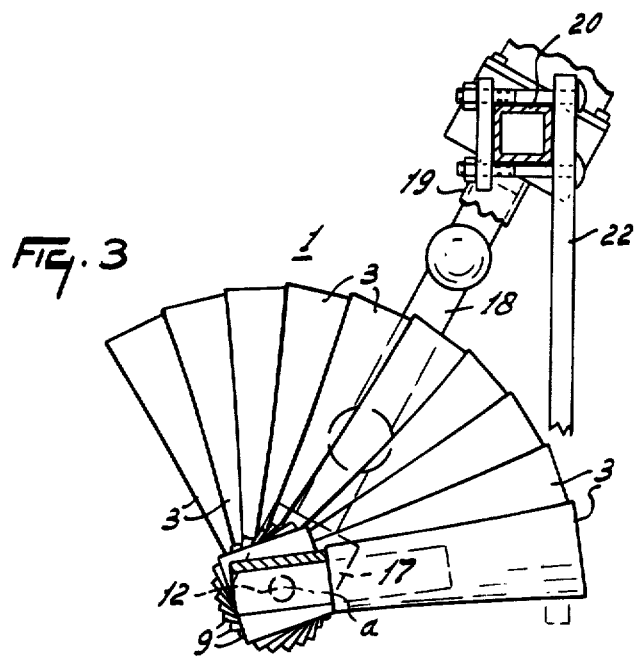
FIG. 3 is a sectional view taken on the line III—III in FIG. 2.

The plow shown in FIG. 1 comprises a guide 1 for the earth, constructed in the form of a mouldboard. There is a share 2 at the front of the guide 1. The guide 1 comprises a row of guide elements 3 in the form of rollers which are arranged one behind the other with respect to the intended direction of movement of earth along the guide 1. Each of the guide elements 3, the peripheries at which are adjacent one another, is supported at one end, this end being located in a vertical plane passing through the right-hand side of the share 2, that is to say the side which is shortest, measured in the intended direction A of operative travel of the plow. Each of the guide elements 3 is hollow and tapers in the direction towards its free end, the largest diameter preferably being about ten centimeters. The generating line of each guide element 3 is slightly curved so that the guide element 3 is concave is viewed in cross-section, or has the shape of a diabolo between its ends. Approximately midway along each guide element 3 there is an internal partition 4 through which extends the end of the shaft 5 disposed inside the element 3 (FIG. 4). Near its ends, the shaft 5 is supported by bearings 6 and 7 inside a sleeve 8. The sleeve 8 projects from the guide element 3 and is fixed within one side of an angular housing 9, into which the shaft 5 projects. The housing 9 is made in two parts, each comprising substantially half of the housing. One of these parts receives the sleeve 8 and the other part serves as a cap and is clamped to the first part by two bolts 10 (FIG. 4). The housing 9 for the guide element 3 nearest the share 2 is fastened to the rear side of the share. Each housing 9 has a flange 11 at the rear which is received in a corresponding recess in the adjacent housing to the front (FIG. 5). The interconnected housings 9 thus constitute a hollow beam which extends horizontally in the direction A rearwardly from the right-hand side of the share 2. This hollow beam accommodates a drive shaft 12, the longitudinal centerline a of which coincides with the longitudinal centreline of the hollow beam. The flanges 11 of the respective housings 9 constitute supports for bearings 14 which are axially located by retaining rings 13. These bearings 14 support the shaft 12. Inside each housing 9, next to the respective bearing 14, the shaft 12 is provided with a bevel pinion 15, which meshes with a bevel pinion 16 on the end of the shaft 5 projecting into the housing 9. The housings 9 are oriented so that the rotary axis b of the guide element 3 directly adjacent the share 2 is substantially horizontal, and the rotary axis b of the succeeding guide elements 3 are inclined upwardly at an angle of 12° to the axis b of the element 3 in front of it. In this way the guide 1 has a helical shape as shown in FIGS. 1 to 3. The rotary axis b of the penultimate guide element 3 is substantially vertical, whereas the rotary axis b of the endmost guide element 3 is inclined towards the outboard side of a vertical plane containing the axis a. The housings 9 can be turned relatively to one another after loosening the bolts 10, so that the angles between the rotary axes b of adjacent guide elements 3 can be changed, to alter the shape of the guide 1.

The housing 9 of the rearmost guide element 3 is connected to a gearbox 17, inside which there is a bevel pinion transmission (not shown) which drivably connects the shaft 12 with an upwardly directed input shaft 18, which is part of a common drive arrangement for the guide elements 3. The assembly comprising the hollow beam made up of the housings 9 of the guide elements 3 and the gearbox 17 is carried by a beam 20 to which it is connected by a support 19 which is inclined to the vertical and is located behind the guide 1. The beam 20 extends in the direction A. A strut 21 is furthermore connected between the support 19 and the beam 20. Another support 22 is secured to the beam 20 by a clamping piece and bolts. The support 22 extends downwardly from the beam 20 at a position approximately midway along the guide 1, and has a forwardly extending part, which is secured to the share 2 behind its tip (FIG. 2). The rear end of the beam 20 supports a furrow wheel 23 which is vertically adjustable and fixable in any one of a plurality of positions. The front end of the frame beam 20 is fitted between two mounting plates 25 for pivotal movement about an upwardly extending, preferably vertical shaft 24. The plates 25 are located, as viewed in the direction A, on the right-hand side of a trestle which is shown hitched to the three-point lifting device of a tractor. On the other side of the trestle 26 there is a supporting arm 27 for a ground wheel 29, which is vertically adjustable by means of a screw spindle 28. A bottle-screw adjuster 30 is pivotally connected between the left-hand side of the trestle 26 and the beam 20 so that the position of the beam 20 relative to the direction A can be varied. At its front end the beam 20 is provided with a disc coulter 31 which co-operates with the leading edge of the share.

The input shaft 18 extending upwardly out of the gearbox 17 is connected by a universal joint with a shaft supported in a gearbox 32. The gearbox 32 is supported at the level of the support 19 on the top of the beam 20. Inside the gearbox 32 there is a bevel pinion transmission (not shown) which drivably connects the input shaft 18 with the shaft extending in the direction A and projecting from the rear of the gearbox 32, where it is connected by the exchangeable wheels 33 of a change-speed gear 34 with a shaft 35 which is also journalled in the gearbox 32 and projects from the front side of the gearbox. The shaft 35 is connected by a universal joint with a telescopic shaft 36, the front end of which is connected by a universal joint with a shaft 38 supported by a bearing 37 near the front end of the beam 20 and shown coupled by an auxiliary shaft 39 to the power take-off shaft of the tractor.

For operation, the plow described above is coupled to the three-point lift of the tractor as shown, and the working depth is established by adjustment of the ground wheel 29 and of the furrow wheel 23. When the plow is adjusted as desired, it is drawn by the tractor in the direction A, during which movement the disc coulter 31 co-operating with the share 2 cuts loose a furrow slice of a given width and a given thickness. As the share 2 advances through the soil, the furrow slice passes over the share 2, rising slightly, and slides onto the guide elements 3 extending transversely of the direction of movement of the furrow slice. These guide elements are driven in the same direction as each other at one of the speeds available by means of the change-speed gear 34. The rotation of the guide elements 3 assists the displacement of the slice along the guide 1. The peripheral speed of the guide elements 3 preferably exceeds the speed of movement of the furrow slice along said guide 1 during operation so that a slip of about ten to twenty percent occurs. The peripheral speed of the guide elements may be 1.96 meters per second.

The guide elements 3 provide a guide surface extending generally helically from a horizontal to a substantially vertical orientation, and the furrow slice, while being displaced laterally, is also progressively turned about its longitudinal axis until it is deposited from the last guide element 3, which as stated above is in a slightly overcenter attitude with regard to the others. From FIGS. 1 and 2 it will be appreciated that the transition from the share 2 to the leading guide element 3 is obtained by arranging the guide element in a recess of the share provided for this purpose.

Figure 6:
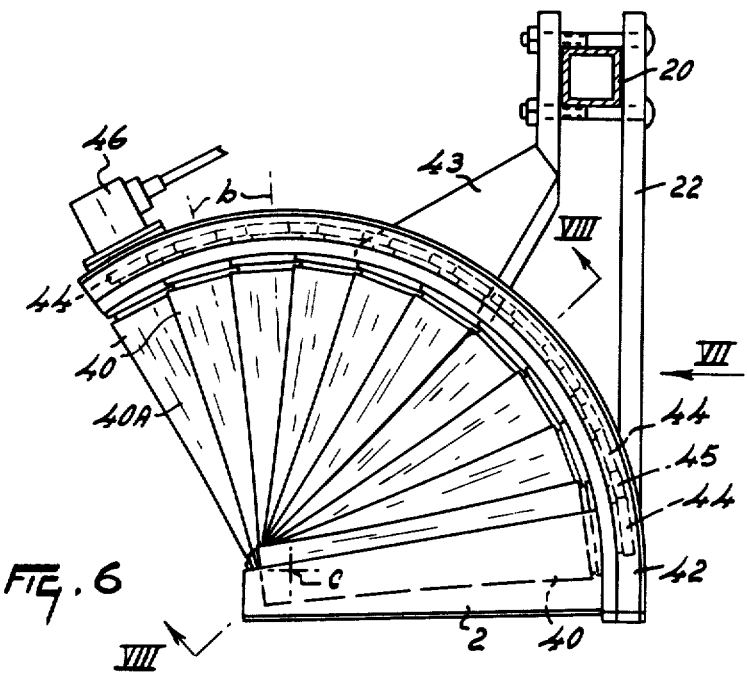
FIG. 6 is a view corresponding to FIG. 3 of another construction for part of the plow.
Figure 7:
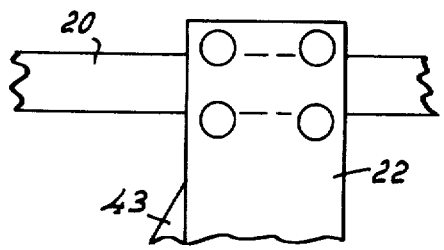
FIG. 7 is a view in the direction of the arrow VII in FIG. 6.
Figure 7:
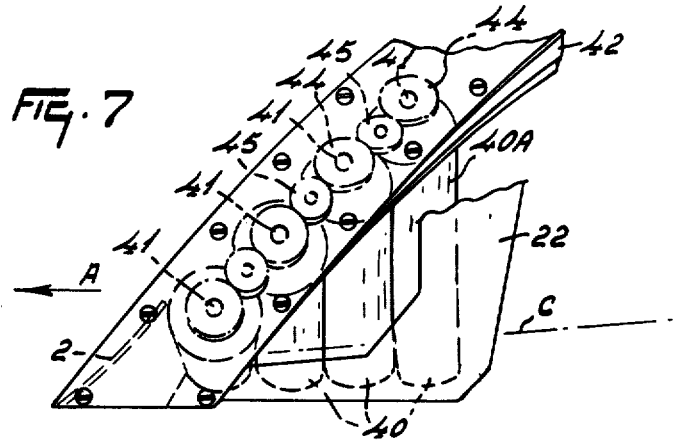

FIGS. 6 and 7 show another plow construction. Parts corresponding with those of the plow shown in FIGS. 1 to 5 are designated by the same reference numerals. In the construction of FIGS. 6 and 7, guide elements 40 of a guide 40A are arranged in substantially the same manner as the elements 3 of FIGS. 1 to 5. As before, they are supported only at one end, but in this case it is the end away from the axis of the helix. Each guide element 40 is carried on a shaft 41 which projects into the element 3 and is supported by a rugged sidewall of a hollow supporting part 42, which follows the desired shape of the helical edge of the guide 40A. The supporting part 42 is retangular in cross-section and has a removable outerwall. It is also secured to the broadest lateral edge of the share 2. The guide 40A is fastened to the beam 20 by the support 22 and furthermore by a second support 43, which, like the support 22, is fastened to the beam 20 by clamping bolts and is connected to the supporting part 42 about midway along its length. Inside the supporting part 42 the shafts 41 of the guide elements 40 are provided with pinions 44. The pinions 44 are drivably connected with one another by smaller, intermediate pinions 45 arranged on shafts. The guide elements 40 are thus driven in the same direction as each other so as to assist the movement of the furrow slice along the guide 40A. The guide elements 40 are arranged so that a straight line c extending in the direction A passes through points of the rotary axes located at a given distance from the free end of the respective guide element 40. Said points are preferably two to ten centimeters from the free ends of the guide elements. For driving the guide elements 40, a hydraulic motor 46 energized by the tractor drawing the plow may be arranged to drive the shaft 41 of the rearmost guide element. The longitudinal center lines of the shafts 41 of the adjacent guide elements are offset about 12° from one another around the line c.

Figure 8:
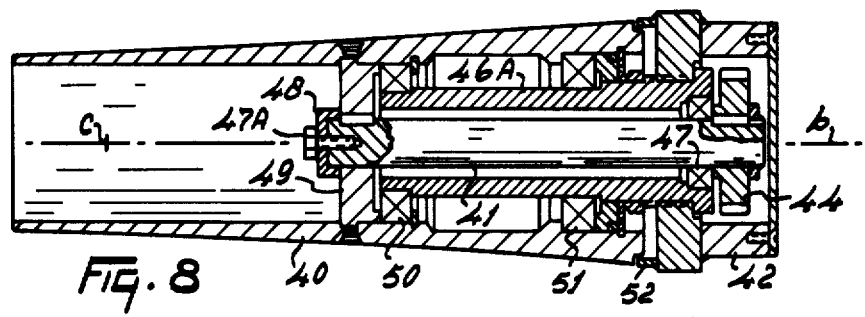
FIG. 8 is a sectional view taken on the line VIII—VIII in FIG. 6.
Figure 9:
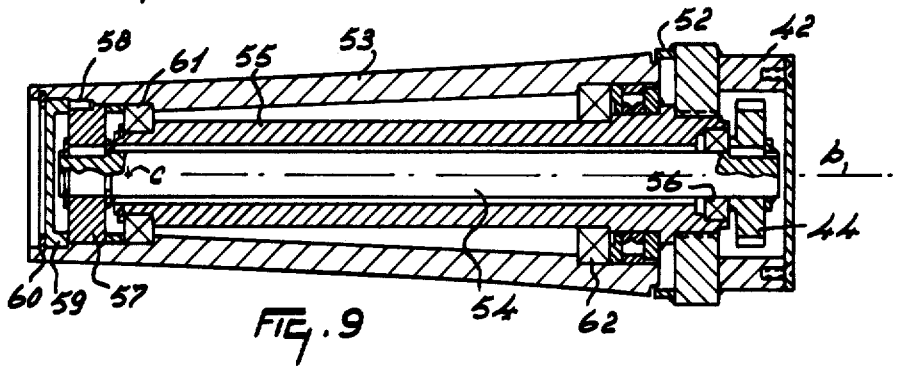
FIG. 9 is a view similar to FIG. 8 showing an alternative construction.

In this construction, the wall of the supporting part 42 facing the guide elements 40, which wall receives the load exerted during operation, as will be apparent from FIGS. 8 and 9, is provided with a sleeve 46A. The shaft 41 is supported in the sleeve 46A by a bearing 47. The end of the shaft 41 away from the supporting part 42 is fastened by a bolt 47A and a locking member 48, to a support 49, which is secured to the inner surface of the guide element 40 approximately midway along its length. The guide element 40 is rotatably mounted on the sleeve 46 by two spaced bearings 50 and 51, one of which is located near the support 49 and the other of which is located near the outer end of the guide element. On the side facing the guide element 40, the supporting wall of the supporting part 42 is provided with a circular rim 52, which co-operates with a recess in the end of the guide element to avoid the penetration of dirt to the bearings 50 and 51. In this construction, as before, the guide elements 40 are tapered and slightly concave as seen in cross-section. The broadest end, which may also have a diameter of about ten centimeters, is supported. The guide elements 40 may be provided with peripheral milled grooves extending lengthwise of the guide element to enhance the grip of the guide elements on the furrow slice to be displaced, so improving the operation of the plow under some conditions.

FIG. 9 shows an alternative guide element 53 supported on a sleeve 55 fastened to the supporting part 42. The shaft 54 is supported in the sleeve 55 in a bearing 56 disposed near the supporting part 42. At the end away from the supporting part 42, the shaft 54, which extends substantially the full length of the element 53, is provided with a fastening part 57, which is locked by a pin 58 on to the end of the guide element 53 away from the supporting part 42. The free end of the guide element 53 is closed by a cap 59 retained by a circlip 60. The guide element 53 is supported in bearings 61 and 62 disposed on near each end of the sleeve 55. The protective rim 52 is provided, as in FIG. 8. When guide elements constructed and mounted as shown in FIG. 9 are used, earth cannot reach the inside of the guide elements.

The plow shown in FIGS. 6 and 7 operates in the same way as the plow of FIGS. 1 to 5. The common drive of the guide elements 40, 53 of the guide 40A may derive from a hydraulic motor 46. The change-speed gear 34 of FIGS. 1 to 5 may also be employed so that the speed of rotation of the guide elements can be varied. By using pinions of different size in both embodiments, the guide elements can have different speeds of rotation from one another. It may, for example, be desirable for the guide element directly adjacent the share 2 to rotate at a lower speed of rotation than the others, and/or it may be advantageous for the rearmost guide element to be driven at a higher speed of rotation for turing over the furrow slice reliably, for example, on very heavy soil. The change-speed gear 34 enables the speed of rotation of all of the guide elements to be suited to the prevailing conditions, the kind of soil, the speed of travel and the desired cultivation in order to pass the earth along the guide in a manner such that even under widely differing conditions the power requirement can be kept to a minimum. Since in the plow of FIGS. 1 to 5 the shape of the guide 1 can be modified by changing the relative orientations of the guide elements, the guide 1 as a whole can assume a shape matching the kind of soil to be worked by the plow. When working sandy soil, for example, the guide 1 may be more concave, whereas on heavy soil the guide 1 preferably has a gradually changing, helical shape. Moreover, the average diameter of the guide elements may be enlarged or reduced from one end of the guide element.

Figure 10:
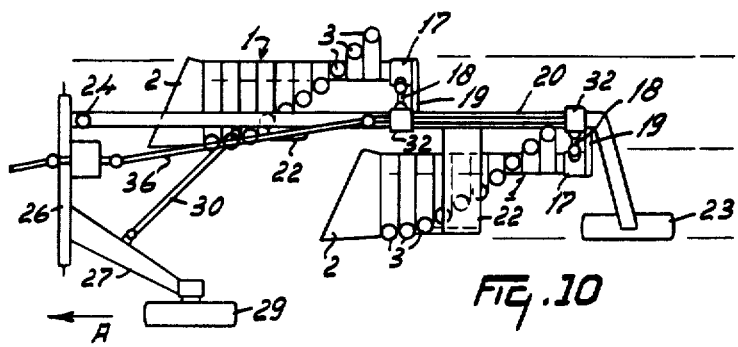
FIG. 10 shows schematically a two-share plow.
Figure 11:
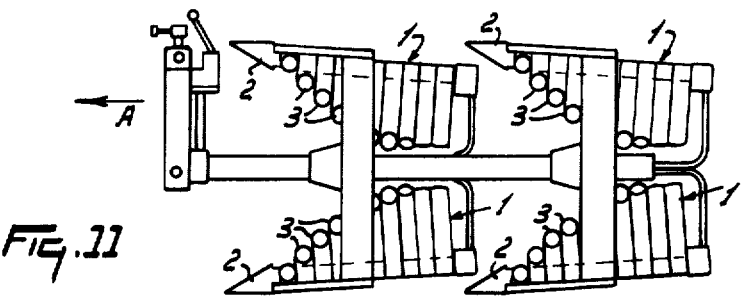
FIG. 11 shows schematically a reversible two-share plow.

FIGS. 10 and 11 schematically show a circulating twin-share plow and a twin-share reversible plow, both provided with mouldboard-shaped guides 1 corresponding to that used in the plough of FIGS. 1 to 5. With such multi-share plows a guide as described in FIGS. 6 to 9 may, of course, alternatively be employed, Moreover, it is not necessary to construct all mouldboard-shaped guides as described herein, since it is possible to use a combination of the generally known mouldboard-shaped guide elements with the guide elements in the embodiments described above. Guides according to the invention may be employed not only in plows, but anywhere in soil cultivating machines in which earth is to be displaced.

While various features of the plow described and illustrated in the drawings are in the following claims as inventive features, the invention is not necessarily limited to these features and may encompass one or more features described both individually and in various combinations.

We claim:

1. A soil working machine comprising a frame with coupling means attachable to a prime mover and at least one tool, said tool having a guide for displaced soil, said guide comprising rotatable guide elements positioned one behind the other successively to receive and guide the displaced soil, said elements being mounted to rotate about respective axes and driving means connected to rotate said elements, said driving means including a change speed transmission and being connectable to a source of power, said transmission being located adjacent one end of said guide, said elements having ends supported by supporting means extending in the direction of the machine's travel, said supporting means interconnecting said ends and being so constructed and arranged that said ends are angularly adjustable relative to one another about a longitudinal axis that also extends in the direction of machine travel.

2. A machine as claimed in claim 1, in which said guide elements are rotatably driven from a drive shaft which extends in the direction of travel, said drive shaft projecting into a further gear box to a bevel pinion that drivingly connects said drive shaft with an upwardly extending input shaft, said input shaft being driven via the change-speed transmission and an auxiliary shaft of the p.t.o.

3. A machine as claimed in claim 1, in which the guide elements are elongated and form a generally helical guide surface which changes from a substantially horizontal orientation to a substantially vertical orientation from the front to rear.

4. A machine as claimed in claim 1, in which said support means comprises respective housing on each said end and the latter together comprise a hollow beam extending in the direction of the machines travel, said housings being angularly adjustable relative to one another about the longitudinal axis of said hollow beam, said driving means comprising a drive shaft being connected to rotate said elements.

5. A machine as claimed in claim 4, in which a respective bevel pinion for each element is connected to the shaft, said pinion co-operating with a further bevel pinion on a corresponding support shaft for each element, said pinions being contained in said hollow beam.

6. A machine as claimed in claim 1, in which each element is hollow and accommodates a support shaft which is held in that element at a location approximately midway along the length of the element.

7. A machine as claimed in claim 6, in which each element is generally frusto-conical and concave as viewed in cross-section.

8. A machine as claimed in claim 1, in which the change-speed transmission comprises exchangeable gear wheels in a gear box adjacent the rear of said guide and said box is connectable to a p.t.o. shaft of the prime mover.

9. A machine as claimed in claim 1, in which said support means comprises housings having flared ends that are interfitted and said housings together with guide elements are turnable relative to one another about an axis that extends in the direction of operative machine travel.

10. A machine as claimed in claim 1, in which a supporting frame beam extends in the direction of machine travel and said change-speed transmission is located near the rear end of the supporting beam, said tool comprising a plow and said beam interconnecting the plow to a coupling at the front of the machine.

11. A machine as claimed in claim 10, in which the leading end of the supporting beam is pivoted to said coupling for pivotal movement about an upwardly extending axis, said beam being fixable in any one of a plurality of positions with respect to said coupling, said coupling being a trestle adapted for connection to a three-point lifting device of the prime mover.

12. A machine as claimed in claim 11, in which said trestle mounts a vertically adjustable ground wheel, the rear end of said supporting beam being supported by a vertically adjustable furrow wheel.

13. A machine as claimed in claim 1, in which said elements are elongated and said support means form a common hollow beam positioned below said elements, said tool comprising a forward share and the leading end of said hollow beam being located immediately to the rear of said share.

14. A soil working machine comprising a frame with coupling means attachable to a prime mover and at least one tool, said tool having a guide for displaced soil, said guide comprising rotatable guide elements positioned one behind the other successively to receive and guide the displaced soil, said elements being mounted to rotate about respective axes and driving means connected to rotate said elements, said driving means including a change speed transmission and being connectable to a source of power, said transmission being located adjacent one end of said guide, said elements having ends supported by supporting means that extends in the direction of machine travel, said supporting means interconnecting said ends and being so constructed and arranged that said ends are angularly adjustable relative to one another about an axis that also extends in the direction of the machine's travel, and said driving means comprising a drive shaft connecting said ends to rotate said elements.

15. A soil working machine comprising a frame with coupling means attachable to a prime mover and at least one tool, said tool having a guide for displaced soil, said guide comprising rotatable guide elements positioned one behind the other to successively receive and guide the displaced soil, said elements being mounted to rotate about respective axes and driving means connected to rotate said elements, said driving means including a change speed transmission that is connectable to a source of power, said transmission being located adjacent one end of said guide, said elements having ends supported by respective housings and the latter together comprising a hollow beam extending in the direction of machine travel, said housings being angularly adjustable relative to one another about the longitudinal axis of said hollow beam, a drive shaft housed within and coaxial with said hollow beam being connected to rotate said elements.

* * * * *